United States Patent [19]
Trubiano

[11] 3,963,255
[45] June 15, 1976

[54] SHOPPING CART SEAT CONSTRUCTION

[76] Inventor: Antoine Trubiano, 36 Marien St., Montreal East 550, Quebec, Canada

[22] Filed: Apr. 4, 1975

[21] Appl. No.: 565,219

[52] U.S. Cl. ............................................ 280/33.99 B
[51] Int. Cl.² ........................................... B62B 11/00
[58] Field of Search ............................. 280/33.99 B

[56] References Cited
UNITED STATES PATENTS

| | | | |
|---|---|---|---|
| 2,860,885 | 11/1958 | Schweitzer | 280/33.99 B |
| 2,891,801 | 6/1959 | Sides | 280/33.99 B |
| 3,157,410 | 11/1964 | Hummer | 280/33.99 B |

*Primary Examiner*—M. H. Wood, Jr.
*Assistant Examiner*—Milton L. Smith

[57] ABSTRACT

A shopping cart comprising an open-topped container having a bottom wall, spaced side walls and a front wall. An end gate forms a rear wall for the container and has leg holes in an upper portion thereof. A secondary gate is pivotally connected at a lower end thereof to the end gate below the leg holes. A folding and unfolding seat is secured between these gates, and a seat support slide member is pivotally connected at one end to the end gate to support and position the seat adjacent a lower edge of the leg holes between the end gate and secondary gate. The secondary gate is slidingly retained at opposed vertical side edges thereof in a respective end channel formed integrally with the seat support slide member whereby the secondary gate is displaceable towards and away from the end gate from its pivotally connected lower end. The end channels are slidingly displaced along a predetermined length of the opposed vertical side edges of the secondary gate whereby the seat frame may be positioned substantially horizontal and the secondary gate inclined away from the end gate to constitute a back rest in an upper portion thereof above the seat.

6 Claims, 5 Drawing Figures

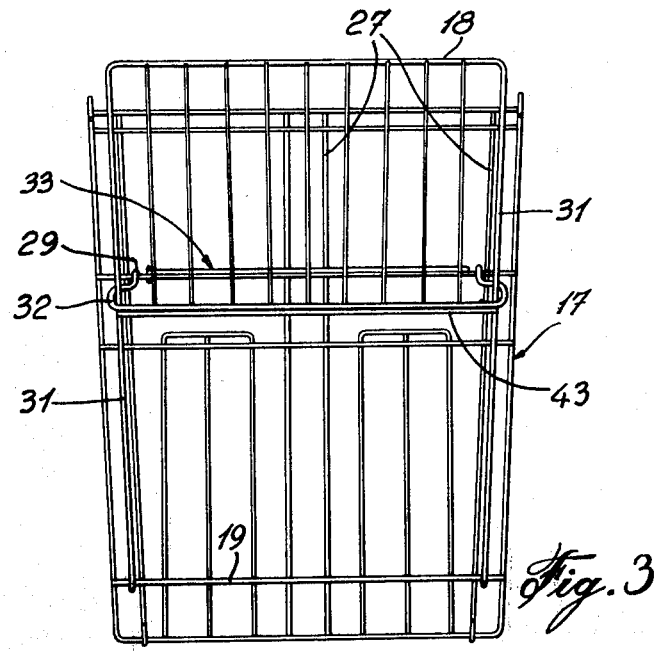
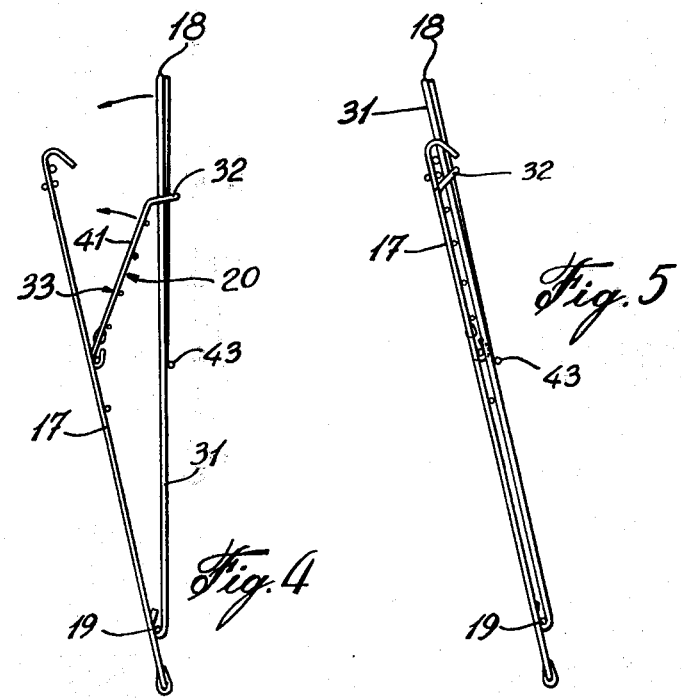

SHOPPING CART SEAT CONSTRUCTION

BACKGROUND OF THE INVENTION

1. Field of the Invention

The present invention relates to an improved shopping cart infant seat construction.

2. Description of Prior Art

Conventional nesting shopping carts have heretofore been provided with a foldable seat structure adjacent the rear wall of the shopping cart whereby the displacement of a secondary gate inside the cart container causes a seat to unfold adjacent the rear wall of the shopping cart. The seat structures as heretofore provided are constructed of many moving parts, thus requiring movement of hinges or hingeable wire loops to cause the foldable displacement of the seat structure and secondary gate. A disadvantage of such construction is that the more moving parts there are, the more chances of malfunction or breakages exists. Further, the apparel being worn by an infant sitting on the seat may sometimes engage between these moving parts thus causing the apparel to tear when the infant displaces himself in the seat or when he is removed from the seat. A still further disadvantage is that because of the many moving parts, it is time-consuming and more expensive to construct the seat structure.

SUMMARY OF THE INVENTION

It is a feature of the present invention to provide a folding and unfolding seat structure which substantially overcomes the above-mentioned disadvantages.

A further feature of the present invention is to provide a seat structure having very few moving parts and which is economical to construct.

A still further feature of the present invention is to provide a folding and unfolding seat structure having a unitary seat support slide member.

In accordance with the above features, from a broad aspect, the present invention provides a shopping cart comprising an open-topped container having a bottom wall, spaced side walls and a front wall. An end gate forms a rear wall for the container and has leg holes in an upper portion thereof. A secondary gate is pivotally connected at a lower end thereof to the end gate below the leg holes. A folding and unfolding seat is secured between these gates. The improvement comprises the provision of a seat support slide member pivotally connected to one end to the end gate to support and position the seat adjacent a lower edge of the leg holes between the end gate and secondary gate. The secondary gate is slidingly retained at opposed vertical side edges thereof in a respective end channel formed integrally with the seat support slide member whereby the secondary gate is displaceable towards and away from the end gate from its pivotally connected lower end. The end channels are slidingly displaced along a predetermined length of the opposed vertical side edges of the secondary gate whereby the seat frame may be positioned substantially horizontal and the secondary gate inclined away from the end gate to constitute a back rest in an upper portion thereof above the seat.

BRIEF DESCRIPTION OF THE DRAWINGS

A preferred embodiment of the present invention will now be described with reference to the accompanying drawings in which:

FIG. 3 is a front view showing the seat structure in its operative position with the seat substantially horizontal;

FIG. 4 is a side elevational view showing the seat structure in an intermediate operative position; and FIG. 5 is a side elevational view showing the seat structure in its collapsed or non-use position.

DESCRIPTION OF THE PREFERRED EMBODIMENTS

Figure 1:
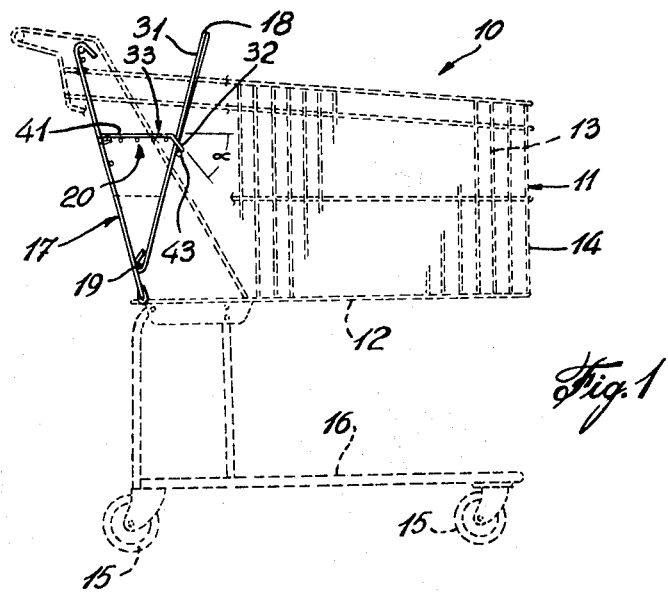
FIG. 1 is a simplified view of a nestable shopping cart showing the location of the folding and unfolding seat structure of the present invention.
Figure 2:
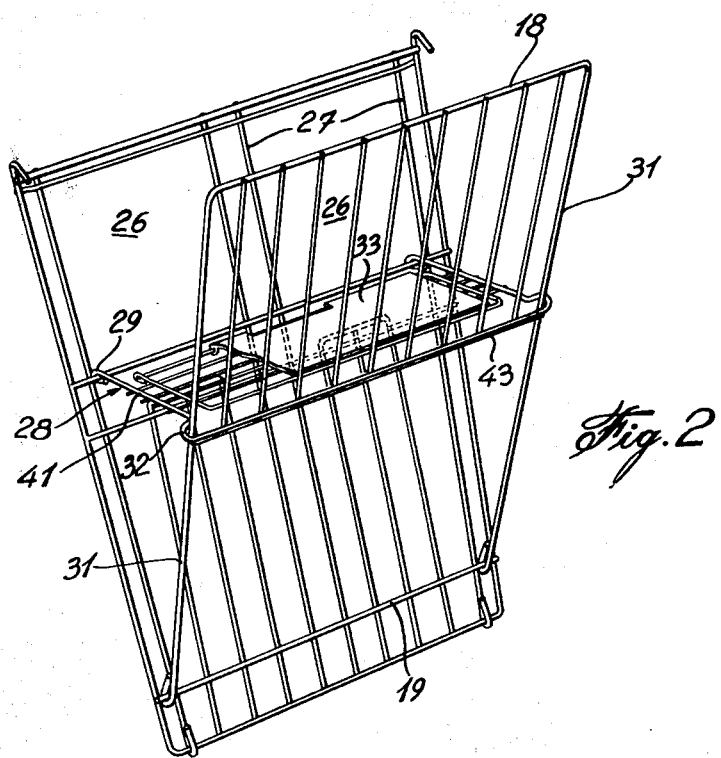
FIG. 2 is a perspective view of the folding and unfolding seat structure of the present invention.

Referring now to the drawings, and more particularly to FIG. 1, there is shown a shopping cart 10 of the nestable type and comprising an open-topped container 11 having a bottom wall 12, spaced side walls 13, and a front wall 14. The container 10 is supported above ground on casters 15 mounted to a support frame 16. An end gate 17 forms the rear wall of the container. A secondary gate 18 is pivotally connected at a lower end thereof 19 to the end gate 17 and the linkage 20 therebetween constitutes the seat.

Referring now to FIGS. 2 to 5, there is better illustrated the construction of the seat structure 25 and comprising essentially the end gate 17, the secondary gate 18 and the linkage 20 therebetween. The shopping cart and seat structure 25 herein shown is made of the conventional steel wire meshing. As more clearly illustrated in FIG. 2, the end gate 17 is provided with leg holes 26 therein defined between transversely extending wire rods 27. The end gate is of substantially rectangular shape with a slight downward taper and the secondary gate 18 is of substantially the same configuration. A seat support slide member 28 is pivotally connected at one end 29 to a transverse rod 30 or other suitable pivoting means secured to the end gate. The secondary gate 18 is slidingly retained at opposed vertical side edges 31, herein constituted by a rod, in a respective end channel 32 formed integrally with the seat support slide member 28 whereby the secondary gate 18 is displaceable towards and away from the end gate 17 (see FIG. 4) from its pivotally connected lower end 19. The end channels 32 are slidingly displaced along a predetermined length of the opposed vertical side edges 31 of the secondary gate whereby the seat frame 40 may be positioned substantially horizontal (as shown in FIG. 3) with the secondary gate 18 inclined away from the end gate 17 and also from the vertical axis whereby to constitute a back rest in an upper portion 33 thereof above the seat frame 40. The predetermined length of travel of the end channels 32 is the distance of travel of the end channels 32 along the side edges 31 from its operative position as shown in FIG. 3 to its collapsed or non-use position as shown in FIG. 5.

The seat support slide member 28 is herein constituted by a single wire formed to define a pair of spaced apart side members 41 shaped as a hook at one end to form the hinge 29 and at the other end being formed in an angulated U-shape bend to form the channels 32. The U-shaped bends define a common outer arm 42 extending transversely to the longitudinal axis of the secondary gate 18 between the opposed vertical side edges 31 thereof. The side edges 31 are also rod-like elements and are captive in sliding relationship within the U-shaped bends or channels 32.

As shown more clearly in FIGS. 3 to 5, the side members 41 are angulated downwardly in the region of the U-shaped channel whereby to provide the sliding retention of the secondary member 18 therewith. The angle $\alpha$ formed by each angulated channel with respect to the longitudinal axis of the side member 41 is calculated to be substantially 60° with a tolerance of approximately ± 5° and with a spacing between the gates 17 and 18 of approximately 6 inches within the plane of the seat frame 40.

In order to prevent the sliding displacement of the channels 32 in its downward direction below the horizontal plane, there is secured a transverse stop rod 43 from across the side edges 31 to constitute a stop means. Thus, the common outer arm 42 will abut against the stop rod 43 to prevent further sliding in the downward direction below the horizontal plane. The seat frame 40 is constituted by a plurality of wire rods secured between the side members 41 of the seat support slide member 28. A flat plate member 44 is preferably secured to this wire mesh or otherwise hinged thereon to provide for a smooth surface seat.

As shown in FIG. 3, the seat structure 25 is shown in its operative position. When the seat is not required, the secondary gate 18 may be collapsed or displaced to a storage position adjacent the end gate 17 by displacing the secondary gate 18 on its hinged lower end towards the end gate 17. By this action, as shown in FIG. 4, the end channels 32 will slide up along the vertical side edges 31 of the secondary gate, as the secondary gate is displaced towards the end gate, with the seat frame 40 moving substantially towards the plane of the leg holes 26 to assume a collapsed position as shown in FIG. 5. Seeing that the end gate is normally angulated from the vertical plane with the upper end thereof extending rearwardly away from the vertical plane, the secondary gate will be easily retained thereagainst as it has a tendency to rest against the end gate when in this collapsed position. The end channels also frictionally hold the secondary gate in this position.

It can be seen that the construction and assembly of this seat structure is substantially simple in that the entire seat support slide member 28 may be formed by one weld operation as there is no requirement for additional hinges or loop parts to be secured thereto to provide the sliding movement or other means of movement for displacing the secondary gate towards the end gate and to provide for a seat frame. To assemble the seat support slide member to the secondary and end gates, the end channels 32 are slid over the secondary gate from the top end 45 of the secondary gate 18. The pivotal connection 29 at the free ends of the seat support slide member is then made by applying pressure to slightly close the hook ends, already formed at the free ends, about the pivot rod 30.

Although the present invention describes a seat structure formed from wire meshing of the conventional type as heretofore known in the construction of shopping carts, other mechanically equivalent types of members may be used to achieve the same purpose.

I claim:

1. In a shopping cart comprising an open-topped container having a bottom wall, spaced side walls and a front wall, an end gate forming a rear wall for said container and having leg holes in an upper portion thereof, a secondary gate pivotally connected at a lower end thereof to a fixed connecting point on said end gate below said leg holes, and a hinged seat between said gates, the improvement comprising a seat support slide member pivotally secured to a fixed connecting point at one end to said end gate to support and position said seat adjacent a lower edge of said leg holes between said end gate and secondary gate, said secondary gate being slidingly retained at opposed vertical side edges thereof in a respective end channel formed integrally with said seat support slide member whereby said secondary gate is displaceable towards and away from said end gate from its pivotally connected lower end, said seat support slide member being formed by a single wire defining a pair of spaced apart side members and said end channels, said side members being pivotally connected at said one end to said end gate, said seat being supported between said spaced apart side members, each said end channels being formed by an angulated generally U-shaped bend in said single wire, and a common outer arm extending transversely to the longitudinal axis of said secondary gate between said end channels and outside said secondary gate, each said channels lying in a plane angulated from the longitudinal axis of said side members and defining opposed arms to receive a respective vertical side edge of said secondary gate therebetween whereby to provide free sliding displacement of said channels along a predetermined length of said vertical side edges when said secondary gate is displaced on its pivoted lower end toward said rear wall, said free sliding displacement permitting said seat frame to be positioned substantially horizontal between said secondary gate and said rear wall when said secondary gate is inclined away from said end gate and to lie substantially in the same plane as said secondary gate when said secondary gate is pivoted against and rests on said rear wall.

2. A shopping cart as claimed in claim 1 wherein said end channels lie in a plane angulated downwardly from said side members when said seat is supported substantially in a horizontal plane.

3. A shopping cart as claimed in claim 2 wherein said angle of said channels is substantially 60° ± 5° with a spacing between said gates of approximately 6 inches within the plane of said seat which is positioned substantially horizontal.

4. A shopping cart as claimed in claim 1 wherein stop means is secured to said secondary gate to prevent said end channels from sliding movement beyond a predetermined point along said vertical side edges of said secondary gate.

5. A shopping cart as claimed in claim 4 wherein said stop means is a single wire length welded transversely between said vertical side edges of said secondary gate on an outer side thereof for abutment against said common outer arm of said U-shaped bends.

6. A shopping cart as claimed in claim 1 wherein a wire mesh is secured between said spaced apart side members to support a seat plate thereon and hingeably secured to said wire mesh.

* * * * *